US012800295B2

(12) United States Patent
Fava

(10) Patent No.: US 12,800,295 B2
(45) Date of Patent: Nov. 17, 2026

(54) APPARATUS FOR CONTROLLING TUBULAR OR SHAPED ELEMENTS AND RELATED SCANNING METHOD

(71) Applicant: Starmatik Srl Uninominale, Spresiano (IT)

(72) Inventor: Stefano Fava, Spresiano (IT)

( * ) Notice: Subject to any disclaimer, the term of this patent is extended or adjusted under 35 U.S.C. 154(b) by 86 days.

(21) Appl. No.: 18/678,901

(22) Filed: May 30, 2024

(65) Prior Publication Data

US 2025/0369752 A1 Dec. 4, 2025

(30) Foreign Application Priority Data

Mar. 31, 2023 (IT) ........................ 102023000006414

(51) Int. Cl.
*G01B 11/245* (2006.01)
*B25J 9/16* (2006.01)

(52) U.S. Cl.
CPC ........... *G01B 11/245* (2013.01); *B25J 9/1664* (2013.01)

(58) Field of Classification Search
CPC . G01B 11/245; G01B 11/105; G01B 11/2522; B25J 9/1664; G01N 21/952
See application file for complete search history.

(56) References Cited

U.S. PATENT DOCUMENTS

2004/0246473 A1 12/2004 Hermary
2013/0062262 A1* 3/2013 Nygaard ............ G01B 11/2433 209/552
2015/0300810 A1 10/2015 Foitík
2016/0107365 A1* 4/2016 Sasaki ..................... B29C 48/09 425/72.1
2023/0196188 A1* 6/2023 Horowitz ............... G06N 20/00 209/577

FOREIGN PATENT DOCUMENTS

DE 19901091 7/2000
DE 19901091 C2 * 9/2003 ............. B65G 15/14
DE 102011119658 A1 * 5/2013 ......... G01B 11/2408
WO 9947885 9/1999

* cited by examiner

*Primary Examiner* — Jennifer D Bennett
(74) *Attorney, Agent, or Firm* — Themis Law

(57) ABSTRACT

An apparatus for scanning tubular elements or shaped elements includes, in one embodiment, a scanning device having at least three optical sensors distributed around a point and all oriented toward such point, and a feeding system oriented so as to cause the tubular/shaped elements to advance along a feeding direction from a station upstream of the scanning device to a station downstream of the scanning device, passing through the point. The scanning process using such apparatus is also described.

10 Claims, 3 Drawing Sheets

APPARATUS FOR CONTROLLING TUBULAR OR SHAPED ELEMENTS AND RELATED SCANNING METHOD

FIELD OF THE INVENTION

The present patent concerns automated systems for machining tubular elements or section bars in general, with closed or open cross section, and in particular it concerns a new system for production control of tubular elements or section bars through scanning of said tubular elements or section bars and the related check and comparison against stored models.

More specifically, the new system can be used with section bars having closed or open cross section and any geometrical shape, angular, concave, convex, etc.

BACKGROUND OF THE INVENTION

Production processes are known which involve the manufacture of tubular elements or section bars made of a metallic or plastic material, with any cross section, open or closed, with or without windows or openings in general.

Section bars are usually loaded into a machine that cuts the section bar and any windows or openings therein, then the section bar is transferred onto a belt from which it is picked up by a handling device that takes it to the next machining stations.

A drawback of the known systems lies in that the handling device must know the exact shape, position and orientation of the section bar in order to be able to grip it correctly. For example, a section bar could be oriented with its head end facing towards the feeding direction, while the next section bar could be oriented according to the opposite direction, with the tail end facing towards the feeding direction. In this case, the handling device must know the position of the section bar, in order to be able not only to grip it but also to rotate it to the correct position, so that it can be transported to the next machining stations.

In addition to the above, often the scraps resulting from the cutting and shaping operations carried out on the section bars do not come off the body of the section bar completely, or remain inside it or partially welded to it, hindering the subsequent operations or negatively affecting the result, that is, the product to be obtained.

Patent document WO99/47885 describes the scanning of generic objects carried out to determine the weight and size of the same.

Patent document US 2015/0300810 describes scanning elements placed on a rotating support.

Patent document DE 19901091 describes a generic belt conveyor system for various elements.

Patent document US 2004/0246473 describes a scanning system combined with a camera.

To solve the problem described above, one or more operators are required to check each tubular element or section bar, possibly rejecting those which are non-conforming due to the presence of scraps or to incorrect machining.

However, these procedures slow down the production process and prevent full automation of the plant.

SUMMARY OF THE INVENTION

In order to overcome all the drawbacks mentioned above, a new system for carrying out checks on products by scanning tubular elements or section bars in general and comparing the obtained data with those of shapes stored in a database has been designed and manufactured, said system being able to correctly pick up and select said tubular elements.

The two main parts of the new production control system comprise at least one database in which the details of said elements can be and are stored and at least one scanning device, in turn comprising at least three optical sensors, and more preferably from three to five, distributed on a circumference, in turn lying on a plane hereinafter referred to as the scanning plane, and all oriented towards the center of said circumference on which they are distributed.

Alternatively, said sensors are distributed on a cylindrical helical curve, in any case of a few millimeters in height, for example 10-20 mm, and are all oriented towards the axis of the spiral. For the sake of simplicity, the following description makes reference to the scanning plane meaning the plane of the circumference or the median transverse plane of the helical curve.

Preferably, said sensors are uniformly distributed on said circumference or on said helical curve.

In a preferred solution, said sensors are five or more than five. In fact, it was found that the use of five sensors distributed on the scanning plane allows all the possible geometrical shapes of the section bars to be scanned in the best possible way.

Said scanning plane is preferably positioned so that it is orthogonal to the feeding direction of the section bars to be scanned. More specifically, said scanning plane is arranged in such a way that said feeding direction passes through the center of the circumference or is coaxial with the helical curve according to which said sensors are distributed.

The system comprises at least one database with the data of the products to be checked stored therein.

Said database can contain both data obtained during the product design step and data obtained from the scanning of said products. In particular, the scanning of a new tubular element is intended to provide data on the shape of the product, wherein said data is entered into the database to implement the database archive.

The system also comprises a feed system for tubular elements/section bars, comprising at least one slide belt oriented in such a way as to make said section bars advance along a feeding direction and configured so that said section bars are arranged with their longitudinal axis coaxial with said feeding direction.

Said feeding system has the function of transporting the section bars to be scanned from a station upstream of the scanning plane to a station downstream of said scanning plane.

Said feeding system, in particular, preferably comprises at least one first section upstream of said scanning plane and at least one second section downstream of said scanning plane.

Said first upstream section preferably comprises a slide plane having V-shaped cross section, in such a way that each section bar is automatically positioned, by gravity, at the lowest point of the plane, thus actually being arranged with its longitudinal axis parallel to the feeding direction.

In the preferred solution, said V-shaped slide plane consists of two separate sliding planes, inclined with respect to each other, each forming one side of the V-shaped cross section. Said sliding planes slide at the same speed parallel to said feeding direction. As will be explained below, it is not important that the tubular element/section bar is arranged according to a particular head-tail orientation, as the new system can automatically identify this orientation.

Said section downstream of said scanning plane generically comprises at least one plane, preferably a sliding one, which directly or indirectly leads to subsequent machining stations. However, according to the invention, said downstream section can also be configured like said upstream section.

Said upstream section and said downstream section are separated at said scanning plane by a few millimeters, so that at the level of the scanning plane there are no obstacles preventing the scanning of all sides of the section bar passing from one section to the other.

In this way, the sensors arranged circumferentially around the feeding direction of the tubular elements scan all sides of the tubular element as it advances, from one end to the other, thus registering that data of all the cross sections.

From the analysis of the data related to all the cross sections of the section bar it will thus be possible to determine the following:

- head-tail orientation of the section bar, as the end which first passes through the scanning plane is identified;
- shape of the head and shape of the tail;
- shape of the cross section/sections;
- presence of windows or openings on the side parts of the tubular element/section bar.

Starting from the measured data, it is possible to carry out an automated comparison with one or more stored models, so that it is possible to determine which tubular element/section bar model has just been scanned as well as its exact position, orientation and configuration. The data relating to its position will be useful for giving instructions to any handling devices which have to grip, transport and generally machine the section bar in the subsequent steps, while the data relating to its configuration will be useful for rejecting products that are not perfectly cut.

For example, any handling device installed downstream of the scanning plane, on said second feeding part, can correctly and precisely grip the scanned tubular element/section bar, since the type, position and orientation of the latter are known, and can consequently orient it and send it to the subsequent machining stations in a fully automated manner.

In addition, once the scanned section bar model has been determined, it will also be possible to perform a comparison between the scanned data and the stored model data, in order to decide whether to reject it due to the presence of any dissimilarity, for example in terms of shape and size of the openings, and to the possible presence of scraps.

In addition, the data obtained from the full scan of a tubular element/section bar can be used as a comparison model for the tubular elements/section bars to follow. In this way, the new scanning device can be used not only to identify the tubular elements/section bars to be scanned, but also to create a “library” of reference models.

The process of scanning a tubular element/section bar coming from a first machining station and being conveyed to a second machining station, wherein machining station means any station where workpiece machining or handling in general takes place, includes the following steps:

Loading the workpiece onto said first feeding part, which orients said section bar with its axis parallel to a feeding direction.

Advancing the section bar towards said second feeding part passing through said scanning plane.

Section bar scanning: as the section bar slides through the scanning plane, said scanning device scans the workpiece, collecting all the data relating to the workpiece itself.

Collection of the data and, possibly, creation of a model based on said data. Or Comparison of said data with the data relating to an already stored model in order to find any dissimilarity.

Arrival of the scanned section bar at said second feeding part or at a rejection station.

Any model already stored can in turn be a model obtained from the scan of a real section bar or it can be a geometric model of an ideal section bar.

According to the invention, during the scanning of the tubular element/section bar, said sensors making up the scanning device operate sequentially, that is, one at a time, wherein each sensor enables the activation of the successive sensor once the scan has been successfully performed.

The scanning of the entire tubular element/section bar can take place very quickly, as the sensors can altogether perform up to 500 scans per second, so that the tubular element can slide through the scanning plane even at a speed of 500 mm/sec.

The new system can also comprise a handling device, that is, a device intended to grip the tubular element/section bar once it is in said second feeding part.

Said handling device moves automatically according to the scanned data which, as already explained, provides precise information on the orientation and shape of the workpiece to be gripped, moved and handled in general.

The new system can machine section bars of any length, for example between 50 and 2500 mm.

DETAILED DESCRIPTION OF EMBODIMENTS OF THE INVENTION

The new system (100) for scanning section bars (P) or tubular elements having any cross section comprises, in its main parts, at least one scanning device (300).

Figure 3:
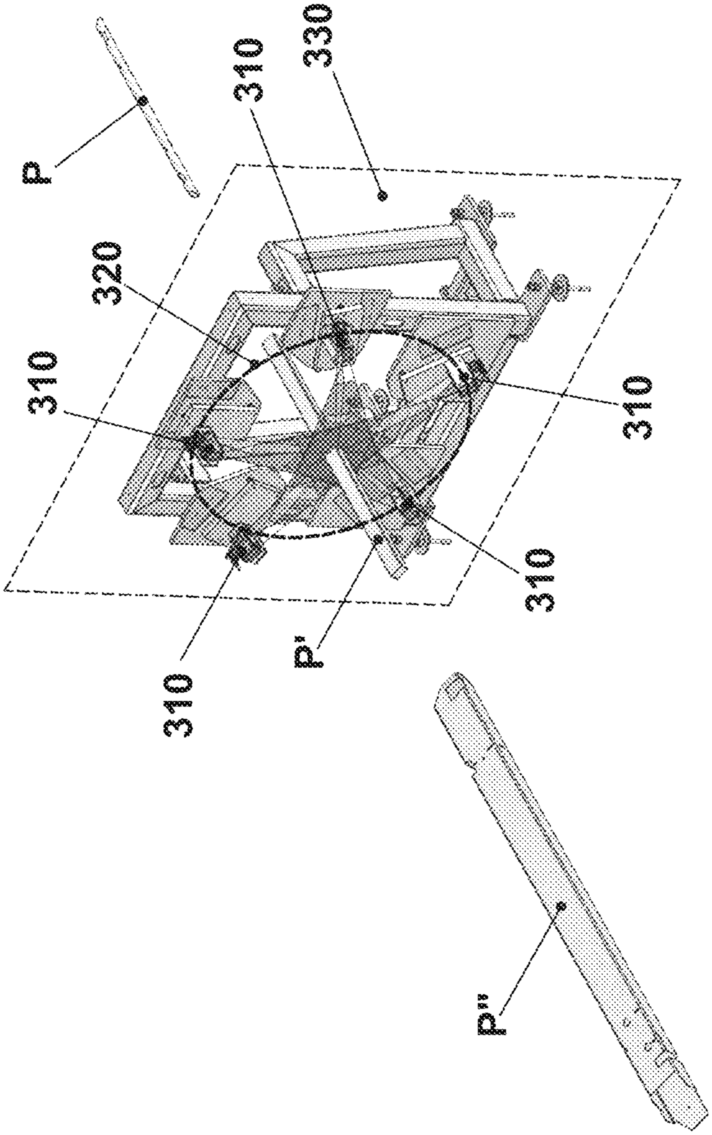
FIG. 3 shows a detail of the scanning device (300) only, without the casing in which it is contained, and shows how said scanning device (300) can scan section bars (P, P', P') in different shapes and sizes.

Said scanning device (300) in turn comprises at least three optical sensors (310), and more preferably at least five optical sensors, substantially distributed on a circumference (320), indicated by a broken line in FIG. 3, that is, equally distributed with respect to a point/area (321) through which each section bar (P) to be scanned will pass.

Said sensors (310) are all preferably arranged on the same plane, or scanning plane (330), indicated by a broken line in FIG. 3, and all oriented towards the center (321) of said circumference (320) on which they are distributed.

Said scanning plane (330) is preferably positioned so that it is orthogonal to the feeding direction (X) of the section bars (P) to be scanned. More specifically, said scanning plane (P) is arranged in such a way that said feeding direction (X) passes through the center (321) of the circumference (320) on which said sensors (310) are distributed.

The system (100) comprises at least one database (700) with the data of the products to be checked stored therein.

Said database (700) can contain both data obtained during the product design step and data obtained from the scanning of said products. In particular, the scanning of a new tubular element is intended to provide data on the shape of the product, wherein said data is entered into the database to implement the database archive.

Figure 1:
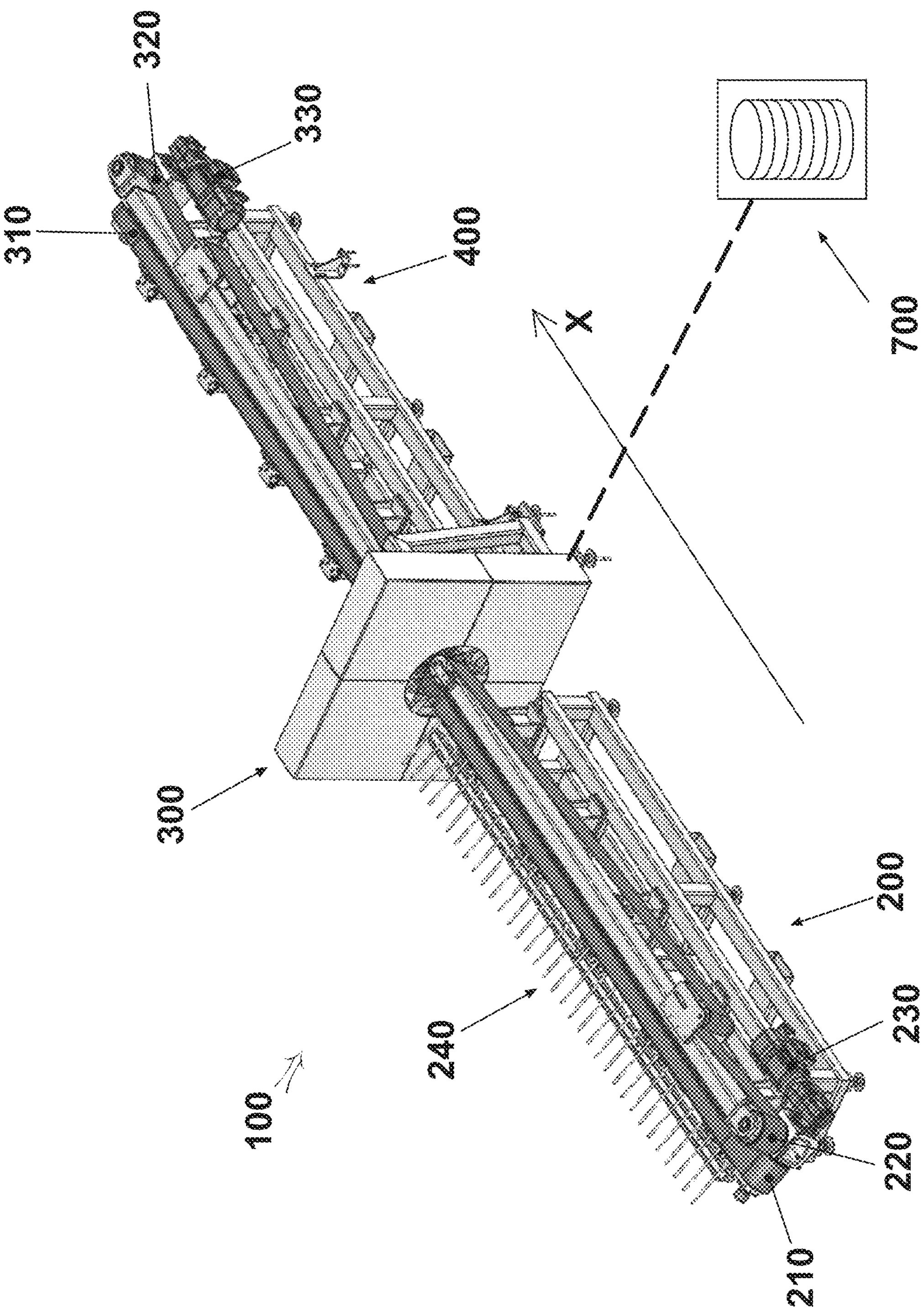
FIG. 1 shows a three-dimensional view of a possible embodiment of the new system (100), in which it is possible to identify, from left to right, the first feeding part (200), the scanning device (300), the second feeding part (400) and the database (700).
Figure 2:
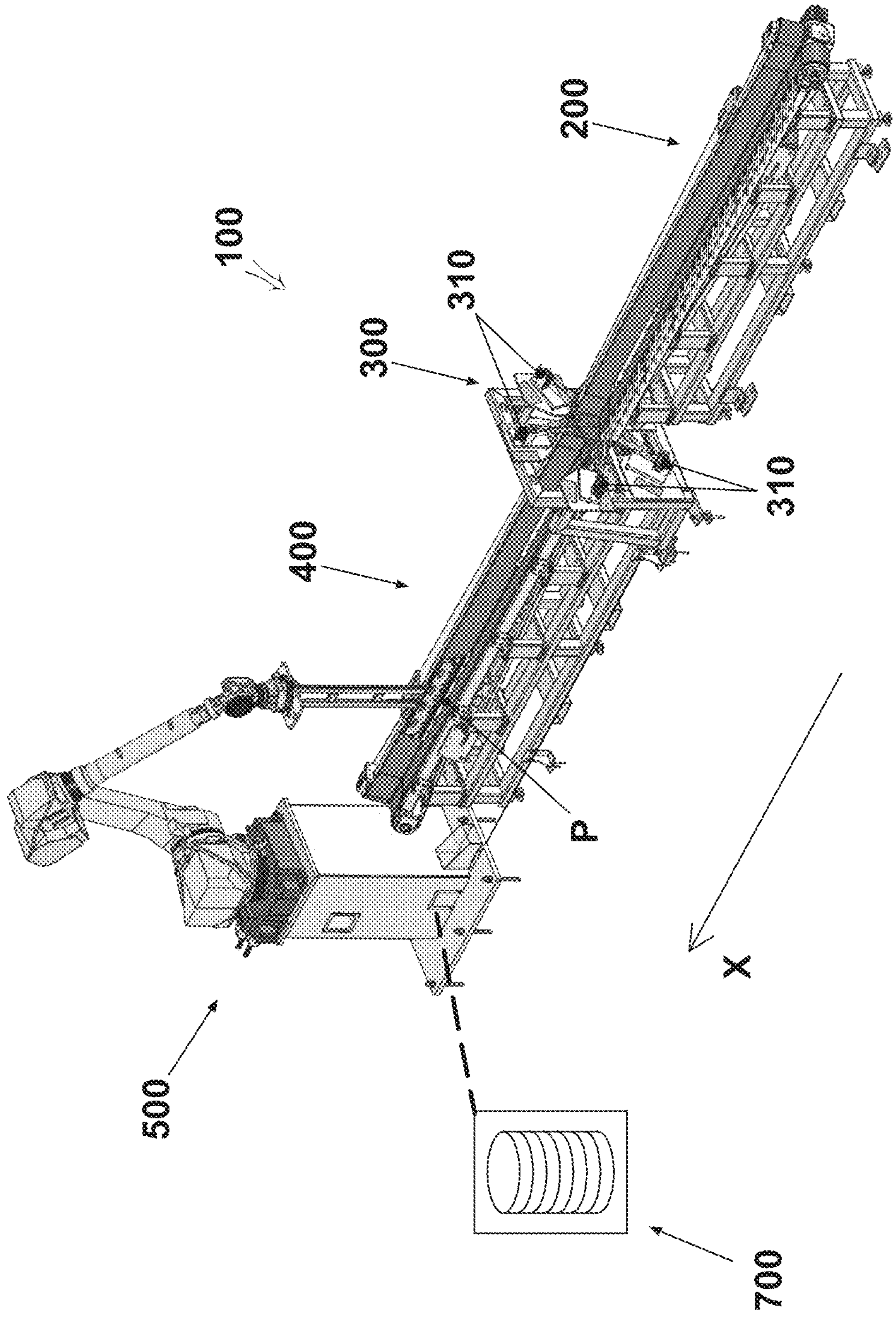
FIG. 2 shows a three-dimensional view of the same system (100) shown in FIG. 1, and a handling robot (500) that picks up a section bar (P) from the second feeding part (400). In this figure, the scanning device (300) is shown without the casing, in which it is contained, and the sensors (310) intended to scan the section bar (P) as it passes through the device (300) itself are therefore visible.

In the solution shown in FIGS. 2 and 3, the new system (100) also comprises a feeding system for said tubular elements/section bars (P), comprising at least one slide belt (210) oriented in such a way as to make said section bars (P) advance along said feeding direction (X) and configured so that said section bars (P) are arranged with their longitudinal axis coaxial with said feeding direction (X). Said feeding system, in particular, preferably comprises at least one first part (200) upstream of said scanning plane (330) and preferably at least one second part (400) downstream of said scanning plane (330).

Said first upstream part (200) preferably comprises a sliding plane with V-shaped cross section, consisting of two separate sliding belts (210, 220) inclined with respect to each other, each forming one side of the V-shaped cross section.

More specifically, the first sliding belt (210) is preferably arranged so that it is almost horizontal, or in any case slightly inclined with respect to a horizontal plane, while the second sliding belt (220) is inclined with respect to said first sliding belt (210).

Said first part (200) also comprises at least one chute or loading means, such as a comb-shaped element (240), through which the section bars (P) fall on the sliding belts (210, 220).

In the solution shown in the figures, said first and said second sliding belt (210, 220) slide at the same speed parallel to said feeding direction (X) and, for example, are driven by the same motor (230).

Said second part (400), downstream of said scanning plane (330), is made analogously to said first part (200) and thus comprises a pair of sliding belts (310, 320) inclined with respect to each other so as to form a sort of V and driven by the same motor (330).

Said first upstream part (200) and said second downstream part (300) are separated at the level of said scanning plane (330) at least by the space needed by the sensors to correctly scan the section bars (P) passing therethrough.

Once the section bar (P) has completely passed through said scanning plane (330), it has been completely scanned.

The system (100) is thus able to recognize the exact type of section bar (P) but also its orientation and position in general, and the section bar (P) can thus be gripped by a handling robot (500).

The new system (100) can also comprise said handling robot (500), that is, a device intended to grip the tubular element/section bar (P) once it is in said second feeding part (400).

Therefore, with reference to the above description and the attached drawings, the following claims are made.

The invention claimed is:

1. An apparatus for production control of tubular or shaped elements, comprising:

a scanning device for scanning tubular or shaped elements having any cross section that is open or closed and a mainly longitudinal extension, defined by a longitudinal axis, the scanning device having a plurality of optical sensors disposed around a point;

a feeding system oriented so as to cause the tubular or shaped elements to advance along a feeding direction from a station upstream of the scanning device to a station downstream of the scanning device, passing through the point, wherein the feeding direction is parallel to the longitudinal axis of the tubular or shaped elements; and a database having one or more models stored therein, wherein data obtained from the scanning device are automatically compared with the one or more stored models, wherein the plurality of optical sensors are distributed on a single circumference having the point as a center through which the tubular or shaped elements pass and defined on a plane that is a scanning plane, wherein the feeding system comprises a first portion upstream of the scanning device and a second portion downstream of the scanning device, wherein the upstream portion and the downstream portion are spaced from each other at a level of the scanning plane, wherein the first portion comprises a sliding plane having V-shaped cross section, so that each tubular or shaped element is automatically positioned, by gravity, at a lowest point of the scanning plane, thereby having the longitudinal axis parallel to the feeding direction, wherein the sliding plane having the V-shaped cross section consists of two separate inclined sliding belts, each forming one side of the V-shaped cross section, wherein each belt is arranged at a different angle from a line perpendicular to the feeding direction, wherein the plurality of optical sensors operate in succession, and wherein each optical sensor is activated when a scan by a preceding optical sensor has been completed.

2. The apparatus according to claim 1, wherein the plurality of optical sensors in the scanning device comprises at least three optical sensors distributed disposed around the point and all oriented toward the point.

3. The apparatus according to claim 2, wherein the feeding direction is orthogonal to the scanning plane through the point.

4. The apparatus according to claim 2, wherein the at least three or more optical sensors comprise five or more optical sensors.

5. The apparatus according to claim 1, wherein the two sliding belts run parallel to the feeding direction and at a same speed.

6. The apparatus according to claim 1, further comprising a handling robot for gripping, moving, or handling the tubular or shaped elements after the tubular or shaped elements have reached the second portion of the feeding system, downstream of the scanning device.

7. The apparatus according to claim 1, further comprising discharging devices of the scanned tubular or shaped elements when the data, obtained from the scanning device and automatically compared with the one or more stored models, do not conform to the one or more stored models.

8. A process for production control of tubular or shaped elements by scanning the tubular or shaped elements, comprising:

arranging a tubular or shaped element on a feeding device, the tubular or shaped element having a longitudinal axis parallel to a feeding direction;

causing the tubular or shaped element to advance through a scanning device according to claim 2, processing the data collected by the three or more optical sensors and related to all cross sections of the tubular or shaped element so as to determine one or more of the following characteristics:

shape of ends of the shaped element, head-to-tail orientation, shape of one or more cross sections, presence and shape of windows or openings on side portions of the shaped element, position of the shaped element on the feeding device with respect to the longitudinal axis of the shaped element; and automatically comparing the collected data and the characteristics deduced from the data with the one or more models, so as to identify any dissimilarities between the scanned tubular or shaped element and a model of the one or more models.

9. The process according to claim 8, further comprising using the data and the characteristics deduced from the data to provide instructions to handling robots that must grip, transport, and process the tubular or shaped element during a subsequent step or to discharge the tubular or shaped element.

10. The process according to claim 8, further comprising using the data and the characteristics deduced from the data to generate a comparison model for tubular or shaped elements to be subsequently scanned.

* * * * *